United States Patent [19]

Brückner et al.

[11] Patent Number: 4,717,128

[45] Date of Patent: Jan. 5, 1988

[54] REFRACTORY PLATE ASSEMBLY INCLUDING WEAR AND EROSION RESISTANT INSERT SURROUNDED BY PLURAL COMPONENT BASE STRUCTURE

[75] Inventors: Raimund Brückner, Engenhahn; Jürgen Plath, Wiesbaden-Biebrich; Ernst Lührsen, Bad Schwalbach, all of Fed. Rep. of Germany

[73] Assignee: Didier-Werke AG, Wiesbaden, Fed. Rep. of Germany

[21] Appl. No.: 919,212

[22] Filed: Oct. 15, 1986

[30] Foreign Application Priority Data

Oct. 30, 1985 [DE] Fed. Rep. of Germany ....... 3538499

[51] Int. Cl.$^4$ .............................................. B22D 37/00
[52] U.S. Cl. ..................................... 266/287; 222/600
[58] Field of Search ............... 266/275, 271, 272, 236, 266/287, 220; 222/600, 603

[56] References Cited

U.S. PATENT DOCUMENTS 4,586,699  5/1986  Bachmann et al. ................. 222/600
4,597,514  7/1986  Thrower ............................ 222/600

FOREIGN PATENT DOCUMENTS 2719105 10/1979  Fed. Rep. of Germany .
2924467  1/1980  Fed. Rep. of Germany .

Primary Examiner—L. Dewayne Rutledge
Assistant Examiner—S. Kastler
Attorney, Agent, or Firm—Wenderoth, Lind & Ponack

[57] ABSTRACT

A refractory plate assembly includes a refractory base structure having therein a recess and a refractory wear and erosion resistant insert positioned within the recess. A frame surrounds the outer periphery of the base structure. The insert and the base structure together define a planar sliding surface. The base structure is formed of at least two components divided along at least one joint extending transverse to the planar sliding surface, each such component defining a respective portion of the recess and surrounding a respective portion of the circumference insert. The insert is elastically clamped within the base structure and may be removed from the base structure for replacement.

19 Claims, 9 Drawing Figures

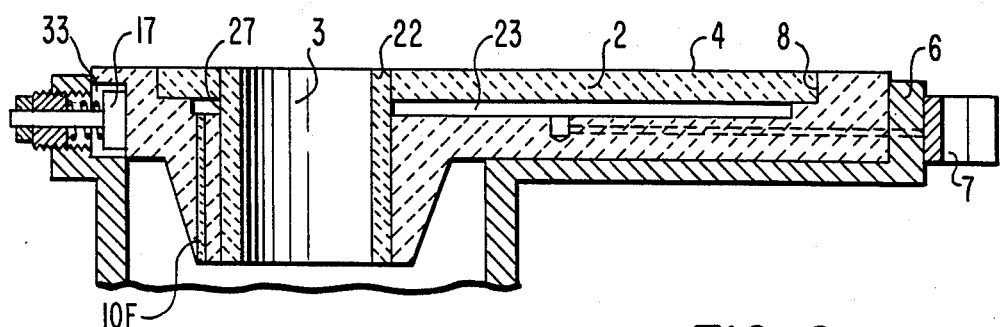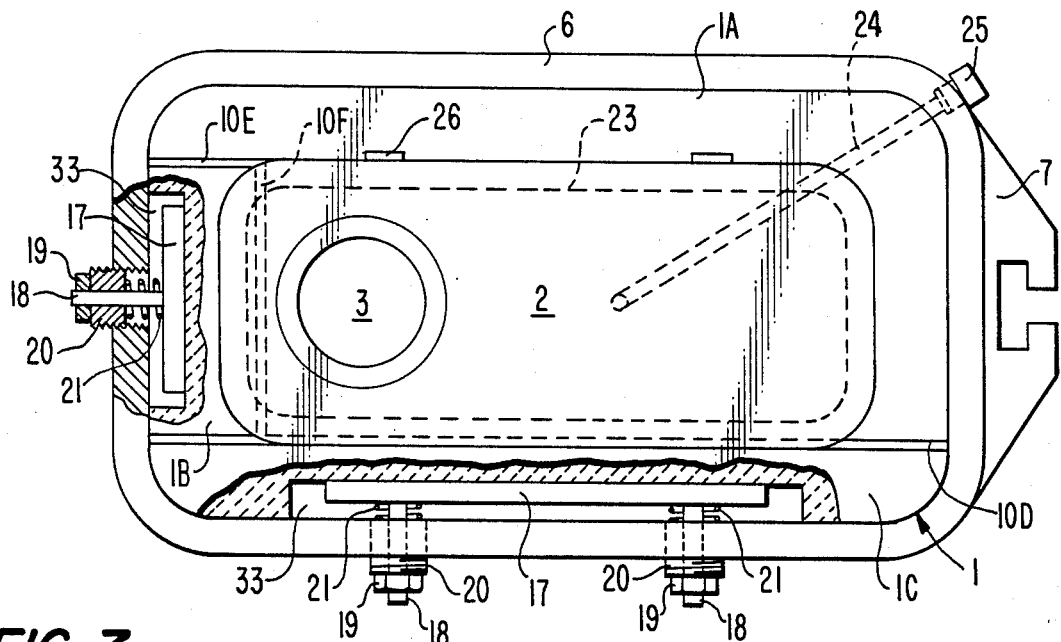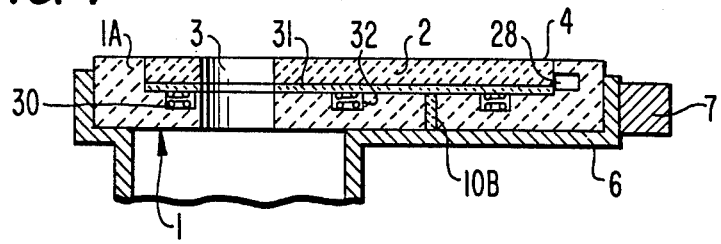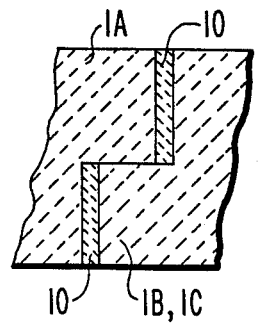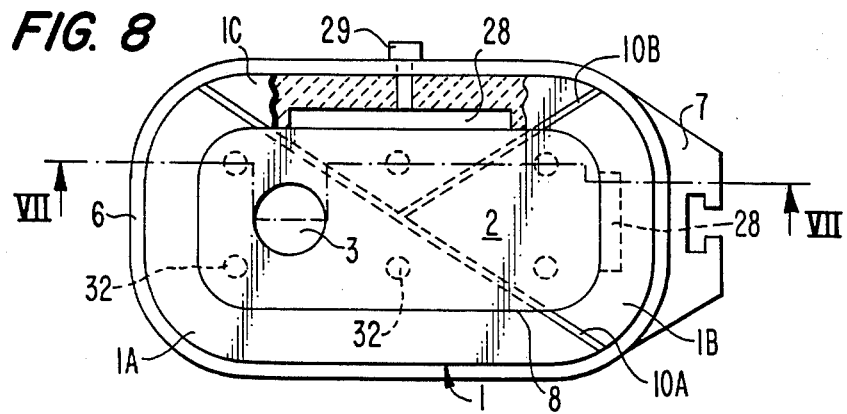

REFRACTORY PLATE ASSEMBLY INCLUDING WEAR AND EROSION RESISTANT INSERT SURROUNDED BY PLURAL COMPONENT BASE STRUCTURE

BACKGROUND OF THE INVENTION

The present invention relates to a refractory wear plate assembly for use in a sliding closure unit for controlling the discharge of molten metal from a metallurgical vessel and of the type held in a stationary or adjustable frame and including a refractory base structure having therein a recess and a refractory wear and erosion resistant insert positioned within the recess, the base structure and the insert together defining a planar sliding surface to be abutted with a planar sliding surface of another refractory plate of the sliding closure unit during relative movement therebetween, the insert and the base structure having therethrough a discharge opening, and the insert having a dimension along the sliding surface thereof at least equal to the range of relative movement.

A refractory plate assembly of this general type is disclosed in West German DE-AS No. 27 19 105, wherein the insert is mounted in the base structure and cannot be replaced, at least not with a reasonable degree of effort, since the insert is embedded in the base structure and can be removed therefrom only with great difficulty. Thus, when the insert has become eroded and must be replaced, the entire plate assembly must be replaced, even though the base structure still has utility.

Furthermore, in such known assembly, particular dimensional tolerances must be maintained between the high value insert and the base structure. If such dimensional tolerances are too close or tight, then thermal stresses eventually will create cracks in the base structure and in the insert during use of the assembly. On the other hand, if the dimensional tolerances between the two elements of the assembly are too great, there inevitably will occur intolerable displacements of the insert relative to the base structure during operation.

SUMMARY OF THE INVENTION

With the above discussion in mind, it is an object of the present invention to provide an improved refractory plate assembly whereby it is possible to overcome the above and other prior art disadvantages.

It is a further object of the present invention to provide such an assembly whereby the insert may be replaced easily so that the base structure can be reused.

It is a yet further object of the present invention to provide such an assembly whereby it becomes unnecessary to maintain the relatively precise dimensional tolerances of the prior art, while avoiding the above disadvantages.

It is an even further object of the present invention to provide such an assembly which results in more cost effective utilization of the refractory material thereof than is possible in the prior art.

These objects are achieved in accordance with the present invention by the provision of a refractory plate assembly of the above type, but including means for elastically supporting the insert within the base structure and for enabling removal and replacement of the insert with respect to the base structure. Specifically, the base structure is formed of at least two components divided along at least one joint extending transverse to the planar sliding surface, each such component of the base structure defining a respective portion of the recess and surrounding a respective portion of the circumference of the insert. Furthermore, a frame supports the base structure and surrounds the outer periphery thereof, a first component of the base structure is stationarily positioned within the frame, at least a second component of the base structure is movably positioned within the frame, and elastically yieldable clamping means, the clamping force of which is adjustable, urges the insert toward the stationarily positioned first component of the base structure. The clamping force is directed at a right angle to the respective adjacent circumference of the insert.

By the above features of the present invention, the insert can be clamped in the base structure so that during operation there do not occur displacements between the insert and the base structure, or at least there will occur only relative displacements of a non-disadvantageous extent and harmless to the operation of the assembly, merely compensating elastically for thermal stresses. As a result, the prior art problems of cracking and destruction of the insert and base structure and displacement therebetween due to the insert being held too loosely or too tightly in the base structure are avoided. Furthermore, an eroded insert easily can be removed and replaced simply by removal of the clamping pressure, whereby the base structure which need not yet be replaced can again be used. This clearly results in a more cost effective utilization of the refractory materials than has been possible in the prior art arrangement. Furthermore, the base structure components, since they are of smaller size, are much less subject to thermal stresses than in the prior art arrangement.

In further accordance with the present invention, the division of the base structure into the plural components relative to the direction of movement of the insert occurs along one or more transverse, diagonal or longitudinal joints. A first base structure components is stationarily positioned or retained in the frame, while the movable or clampable base structure component or components retain the insert clamped against the first component by means of the elastically yieldable clamping means. When plural movable base structure components are provided, then preferably the respective clamping means thereof are independent of one another. This arrangement can be achieved with simple devices and ensures secure clamping of the insert in the base structure, particularly if the clamping means are arranged between the frame and the base structure components and/or between the movable base structure components and the respective circumferential sides of the insert. Each clamping means acts on a respective movable base structure component and may be in the form of a spring, a compressed gas pad or chamber, a pressure cylinder, or the like. Preferably, the clamping means has an extended dimension to act on the respective surface of the movable base structure component and possibly directly on the insert, the extended dimension avoiding the problem of destructive point-like or concentrated pressure loads being applied to the refractory material elements.

In further accordance with the present invention, the clamping force of the clamping means can be adjusted by devices from the outside or exterior of the frame. This particularly is advantageous for clamping means that act on the outer circumferential sides of the movable base structure components. The adjusting devices may be screws or bolts, eccentrics or the like.

In accordance with a preferred arrangement of the present invention, due to relatively high operating temperatures, there are provided in the movable base structure components chambers at levels below the sliding surface, such chambers bordering on the circumferential periphery of the insert. Springs of ceramic material may be positioned in these chambers, or compressed gas may be supplied thereto. This arrangement provides that the insert is elastically urged toward the stationarily positioned base structure component. In particular, compressed gas that is not effected by the high operating temperatures can be allowed to emerge from the compressed gas chamber, since such gas will have a cooling effect and will form a gas seal between the abutting surfaces of the base structure and the insert, thereby preventing any molten metal which has come between the sliding surfaces of refractory plate assemblies from being allowed to pass outwardly thereof. Thus, the use of compressed gas in this manner for achieving the clamping effect also has other advantages.

The joints between the components of the base structure may be defined by confronting planar surfaces, but in accordance with a particularly preferred arrangement which prevents the penetration of molten metal the joints may be defined by confronting stepped or offset surfaces of the base structure components. Further, the joints can be filled with a deformable refractory material, thereby also preventing the penetration of molten metal. One skilled in the art would understand what refractory materials would have such characteristics.

When the assembly is employed in a rectilinearly movable sliding closure unit, and the assembly thereby has an elongated or substantially rectangular shape including spaced parallel long sides and spaced parallel short sides, then in a particularly preferred arrangement the base structure components include a stationarily positioned first component including the discharge opening, a movable second component defining one of the long sides, and a movable third component defining a portion of one of the short sides. In another arrangement, three base structure components include a first, stationarily positioned component separated from second and third components by a first joint, with the second and third components being movable and being separated by a second joint intersecting the first joint.

The same basic principles apply to assemblies having conventional shapes suitable for sliding closure units of the swivelling type and for round assemblies for use in rotary sliding closure units, the division of the base structure in all cases being adapted to the direction of extension of the wear and erosion resistant insert and the direction of relative movement thereof.

In accordance with a further feature of the present invention, there is provided means between the base structure and the insert for urging the insert away from the base structure, i.e. moving the insert in a direction at a right angle to the sliding surface. Thus, in accordance with the present invention, the insert is elastically urged in one direction toward a stationarily positioned base structure component and at the same time may be urged in a direction transverse thereto. This arrangement particularly is desirable in that the insert may be further urged into sealing contact with the sliding surface of another refractory plate assembly of the sliding closure unit to achieve better sealing therewith. The application of the force on the insert to urge the insert away from the base structure in this manner may be achieved by at least one ceramic spring positioned in a blind hole in the base structure and acting on the insert. In a particularly preferred arrangement, this urging may be achieved by the provision of a gas collecting chamber formed between the base structure and the insert, and introducing a compressed gas through the base structure into such chamber. When compressed gas is employed in this manner, then there is achieved the additional advantages of the formation between the abutting circumferential surfaces of the base structure components and the insert a cooling effect and a gas seal by the escape of such compressed gas. This may be facilitated by the provision of passages or gutters between confronting inner and outer circumferential surfaces of the base structure and the insert, respectively.

BRIEF DESCRIPTION OF THE DRAWINGS

Other objects, features and advantages of the present invention will be apparent from the following detailed description, taken with the accompanying drawings, wherein:

FIG. 5 is a longitudinal section through a refractory plate assembly according to a third embodiment of the present invention;

FIG. 6 is a plan view, partially in section, thereof;

FIG. 7 is a longitudinal section, taken line VII—VII of FIG. 8, of a fourth embodiment of the present invention;

FIG. 8 is a plan view thereof with a portion shown in section; and

FIG. 9 is an enlarged sectional view showing a modification of the present invention.

DETAILED DESCRIPTION OF THE INVENTION

Figure 1:
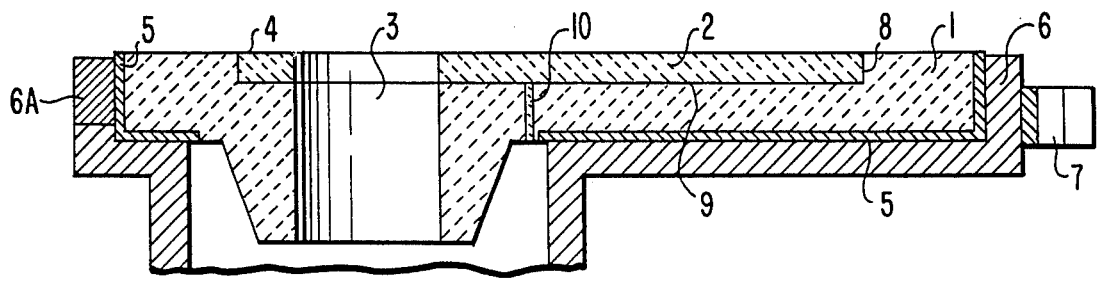
FIG. 1 is a longitudinal section through a refractory plate assembly according to a first embodiment of the present invention.
Figure 2:
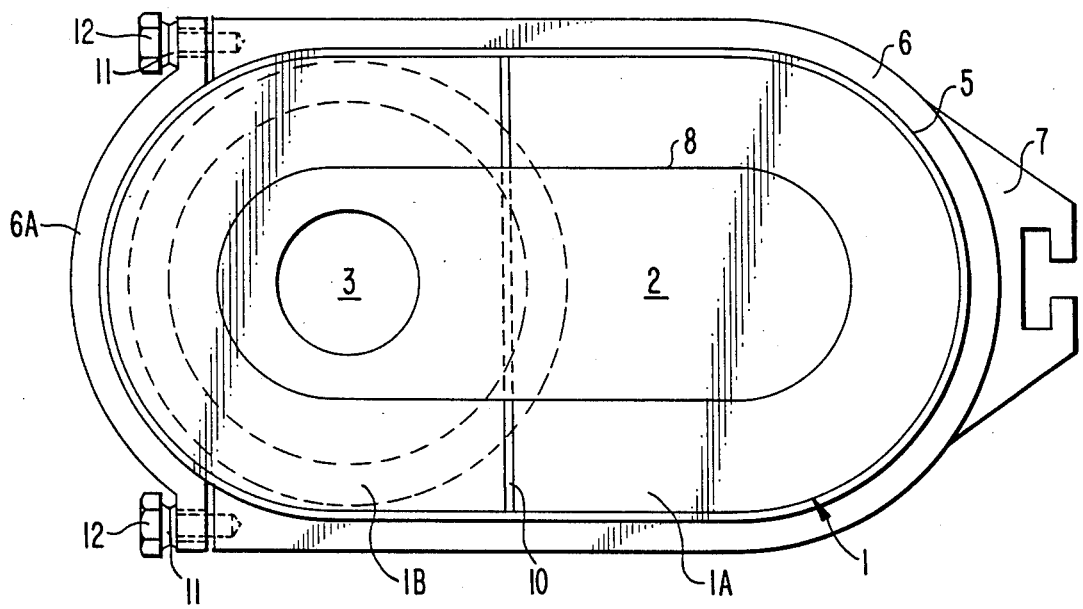
FIG. 2 is a plan view thereof.

In FIGS. 1 and 2 there is shown an arrangement of a movable refractory plate assembly for use as the movable plate in a rectilinearly movable sliding closure unit. The assembly includes a refractory base structure 1 having therein a recess and a refractory wear and erosion resistant insert 2 positioned within such recess. Those skilled in the art would understand suitable materials for base structure 1 and insert 2. The insert and base structure have therethrough and together define a discharge opening 3 in the normal manner, and the base structure and insert also together define a planar sliding surface 4 to be abutted with a planar sliding surface of a stationary refractory plate of the sliding closure unit. A frame 6 supports the base structure 1 and surrounds the outer periphery thereof, and a metal jacket 5 may be provided between the base structure 1 and the frame 6 if desired, in a conventional manner. This assembly is adapted to be moved in opposite rectilinear directions by a drive mechanism (not shown) acting on an adapter 7 in a known manner, thereby to control the discharge of molten metal from a metallurgical vessel.

The base structure 1 surrounding the insert 2 along the outer circumference 8 thereof and along the under-side 9 thereof is less prone to erosion by the discharged molten metal than is the insert 2. Accordingly, base structure 1 may be made of a material which is less erosion resistant and thus less expensive than the material of insert 2. Nevertheless, the insert 2 normally is eroded much sooner than the base structure 1, so that further economical use of the base structure 1 with a new insert 2 requires rapid and simple disassembly of the assembly.

Thus, as shown in FIGS. 1 and 2, in accordance with the present invention there is provide an arrangement for elastically supporting insert 2 within base structure 1 and for enabling removal and replacement of insert 2 with respect to base structure 1. Specifically, base structure 1 is formed of two components 1A, 1B divided along a joint 10 at approximately the middle of the longitudinal dimension of the base structure and extending at a right angle to the sliding surface 4. Joint 10 is filled with a deformable refractory material (of a composition which would be understood by one skilled in the art). Each component 1A, 1B defines a respective portion of the recess in the base structure and surrounds a respective portion of the circumference 8 of insert 2. Base structure component 1A is stationarily positioned within frame 6, and base structure component 1B is intended to be movable therein in a direction at a right angle to joint 10. This is achieved by dividing frame 6 to include a removable frame section 6A. A clamping arrangement is provided for elastically urging movable frame section 6A toward stationary, main frame section 6, and thereby for urging movable base structure component 1B and insert 8 toward stationary base structure component 1A. Specifically, bolts 12 adjustably connect movable frame section 6A to main frame section 6, and cup springs 11 are positioned between bolts 12 and movable frame section 6A to elastically press movable frame section 6A toward main frame section 6. The force of springs 11 is adjustable by threadably adjusting bolts 12. It will be apparent that springs 11 thereby urge movable base structure component 1B and insert 8 toward stationary base structure component 1A, thereby ensuring clamping of the insert within the base structure. Furthermore, when insert 2 has become eroded and must be replaced, this may be achieved very simply and quickly by removing bolts 12, thereby enabling removal of movable frame section 6A, movable base structure component 1B, and the eroded insert 2. Thereafter, a new insert 2 may be positioned in the recess portion of component 1A, and the component 1B, the frame section 6A and the bolts 12 and springs 11 again may be assembled. It will be apparent also that the deformable refractory material of the joint 10 can be renewed as necessary.

Figure 3:
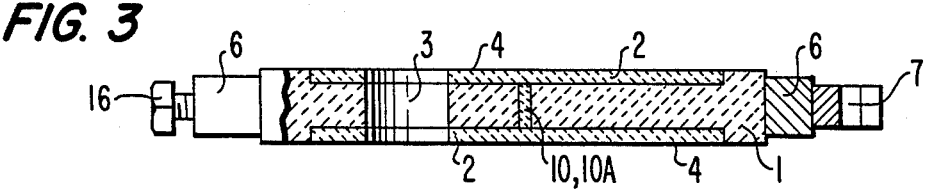
FIG. 3 is a longitudinal section through a refractory plate assembly according to a second embodiment of the present invention.
Figure 4:
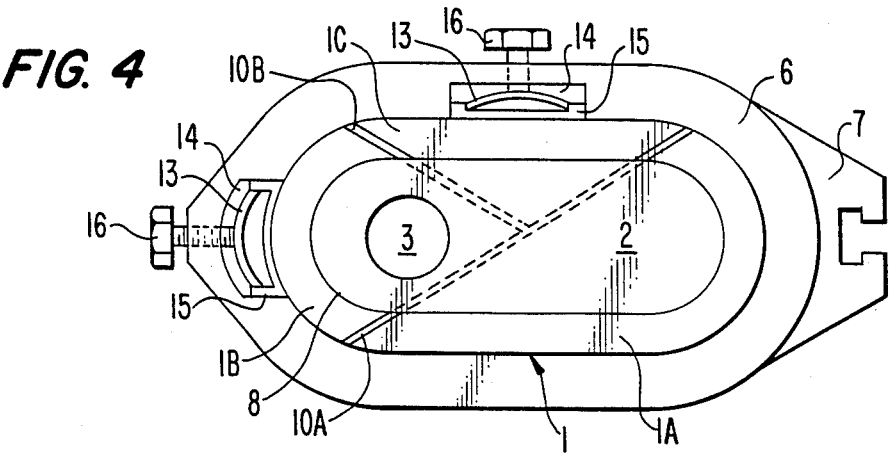
FIG. 4 is a plan view thereof.

With reference to FIGS. 3 and 4, a second embodiment of the refractory plate assembly of the present invention now will be described. Thus, these figures show a sliding plate assembly intended to be the center, movable plate of a three-plate sliding closure unit and having spaced, opposite sliding surfaces 4 to cooperate with a stationary bottom plate and a stationary lower plate. This arrangement accordingly is provided with two wear and erosion resistant inserts 2. This concept may be employed in any of the embodiments of the present invention, including the above discussed embodiment of FIGS. 1 and 2, as well as the embodiments of FIGS. 5 through 8, to be discussed below. In the embodiment of FIGS. 3 and 4, the base structure 1 is divided into three components including a first, stationary component 1A and two movable components 1B, 1C. Component 1A is separated from components 1B, 1C by a first joint 10A extending approximately diagonally through the base structure. Components 1B, 1C are separated from each other by a second joint 10B which is substantially semi-diagonal of the base structure and which joins or intersects first joint 10A. Component 1A defines one long side and one short side of the base structure, component 1B defines the opposite short side of the base structure and includes the discharge opening 3, and component 1C defines the other long side of the base structure. In this arrangement, the frame 6 is of unitary construction, i.e. it does not include a movable section such as 6A of the embodiment of FIGS. 1 and 2. The movable base structure components 1B, 1C are urged toward the inserts 2 and toward the stationary base structure 1A by respective separate clamping devices. Specifically, each clamping device includes a recess 14 formed in frame 6 and having positioned therein an abutment ledge or member 15 acted on by a spring 13. Thus, the spring urges abutment member 15 against the outer circumference of the respective movable base structure component, in a direction substantially transverse to the outer periphery thereof. The operation of the clamping devices of the components 1B, 1C thus clamps the inserts within the base structure. The clamping force of each spring is independently adjustable by a respective bolt 16 threaded through frame 6. It will be apparent that each insert 2 may be removed by releasing the clamping devices and thereby releasing the clamping force of the base structure components 1B, 1C.

FIGS. 5 and 6 illustrate a refractory plate assembly according to a third embodiment of the present invention and having a substantially rectangular configuration including spaced parallel long sides and spaced parallel short sides. In this embodiment, the base structure 1 is divided into three components including a main, stationary component 1A, a movable component 1B defining a portion of one of the short sides and a movable component 1C defining one of the long sides. Specifically, component 1C is separated from components 1A, 1B by a first joint 10D. Component 1B is separated from component 1A by a second joint 10E parallel to joint 10D and by a third joint 10F transverse to joints 10D, 10E. Components 1B, 1C are urged toward component 1A and toward insert 2 by means of respective clamping devices. Thus, in each movable component is formed a respective recess 33, at a level below sliding surface 4, and receiving a respective abutment member 17 which is urged by a spring 21 and guided by a guide pin 18 in a threaded bushing 20 which is threaded into frame 6 and which can be adjusted by a member 19. It will be apparent that the clamping force of each component is individually adjustable by the respective clamping devices. Furthermore, it will be apparent that the clamping force can be released by withdrawal of the clamping devices, whereby the insert 2 can be removed and replaced.

FIGS. 5 and 6 illustrate a further feature of the present invention whereby it is possible to urge the insert 2 away from the base structure 1, i.e. into tighter sealing contact with the sliding surface of another plate assembly of the sliding closure unit. Thus, beneath insert 2 is formed a recess or chamber 23 in base structure 1, and a feed pipe 24 extends through the base structure into chamber 23. A gas inlet connection 25 admits compressed gas to chamber 23, thereby urging insert 2 upwardly. Thus, after clamping of the insert 2 in the base structure 1 by appropriate adjustment of bushings 20, it is possible to adapt the area of the sliding surface 4 which is exposed to the greatest stress, i.e. the respective surface of insert 2, to the sliding surface of the other plate assembly of the sliding closure unit by introducing compressed gas into chamber 23.

FIGS. 5 and 6 further illustrate an arrangement whereby a further wear and erosion resistant refractory sleeve 22 extends through the base structure and the insert and defines the discharge opening 3.

An additional feature of the above arrangements is that the supply of compressed gas to chamber 23 creates a gas seal around the outer circumference 8 of the insert and thereby between the sliding surface 4 and the abutting sliding surface of the other plate assembly of the sliding closure unit, thereby operating to prevent any molten metal which has come between the two sliding surfaces from being discharged to the exterior. This feature may be emphasized by the provision of passageways or gutters 26 between the outer circumference 8 of insert 2 and the confronting inner circumference of the base structure. It also will be apparent that the supply of compressed gas to chamber 23 will create a further gas seal at 27 between the insert 2 and the sleeve 22.

It will be apparent that the above features of the embodiment of FIG. 5 and 6 may be employed in the above discussed embodiments of FIGS. 1 through 4, as well as the embodiment of FIGS. 7-8, to be discussed below.

In the embodiment of FIGS. 7 and 8, the base structure 1 is divided into three components in a manner similar to that of the embodiment of FIGS. 3 and 4. Furthermore, in movable components 1B, 1C there are formed chambers 28 which border respective outer circumferential portions of insert 2. As will be apparent from FIG. 7, chambers 28 are provided at a level below the sliding surface 4. Means are provided in chambers 28 for elastically urging insert 2 toward the stationary base structure component 1A. This may be in the form of ceramic spring elements positioned within chamber 28 or by the supply of compressed gas, for example via inlet connection 29, to chamber 28.

FIGS. 7 and 8 illustrate a further feature of the present invention which represents a modificaiton of the effect of compressed gas chamber 23 discussed above regarding the embodiment of FIGS. 5 and 6. Thus, the insert 2 may be urged away from base structure 1 by means of a plurality of springs, for example ceramic springs 30, positioned in blind holes 32 formed in base structure 1. Springs 30 thus act on insert 2, or possibly on intervening bottom plate 31, to urge insert 2 away from base structure 1 and into tighter sealing contact with the sliding surface of another plate assembly of the sliding closure unit.

It is to be understood that the arrangement of springs 30 and blind holes 32 may be replaced with the chamber 23 of the embodiment of FIGS. 5 and 6, thereby to provide a gas seal in the manner described above. Further alternatively, such chamber could additionally be provided with springs 30. Furthermore, it is to be understood that the above features of the embodiment of FIGS. 7 and 8 may be incorporated in the above discussed embodiments of FIGS. 1-6.

In the above discussed embodiments, the joints 10 are defined by confronting planar surfaces of the respective base structure components. However, as illustrated in FIG. 9, the joints may be defined by stepped or offset confronting surfaces of the respective base structure components. This arrangement has the advantage of providing a more effective seal of the joints.

Although the present invention has been described and illustrated with respect to preferred features thereof, it is to be understood that various modifications and changes of the specifically described structural features may be made as would be apparent to on skilled in the art. Particularly, it is to be understood that although the illustrated embodiments relate to movable plate assemblies of sliding closure units, the present invention equally applies to stationary plate assemblies of such sliding closure units. Furthermore, it is to be understood that the present invention is not limited to plate assemblies of the rectilinearly movable type, as illustrated, but equally applies to plate assemblies which are rotatably or swivelly movable.

We claim:

1. In a refractory plate assembly for use in a sliding closure unit for controlling the discharge of molten metal from a metallurgical vessel, said assembly including a refractory base structure having therein a recess and a refractory wear and erosion resistant insert positioned within said recess, said base structure and said insert together defining a planar sliding surface to be abutted with a planar sliding surface of another refractory plate of the sliding closure unit during relative movement therebetween, said insert and said base structure having therethrough a discharge opening, and said insert having a dimension along said sliding surface thereof at least equal to the range of relative movement, the improvement of means for elastically supporting said insert within said base structure and for enabling removal and replacement of said insert with respect to said base structure, said means comprising:

said base structure being formed of at least two components divided along at least one joint extending transverse to said planar sliding surface, each said component defining a respective portion of said recess and surrounding a respective portion of the circumference of said insert;

a frame supporting said base structure and surrounding the outer periphery thereof;

a first said component being stationarily positioned within said frame and at least a second said component being movably positioned within said frame; and elastically yieldable clamping means, the clamping force of which is adjustable, for urging said insert toward said first component.

2. The improvement claimed in claim 1, wherein said joint is filled with a deformable refractory material.

3. The improvement claimed in claim 1, wherein confronting surfaces of said components defining said joint are stepped.

4. The improvement claimed in claim 1, comprising two said components divided by a single said joint.

5. The improvement claimed in claim 1, comprising three said components including a first said component separated from second and third said components by a first said joint, said second and third components being separated by a second joint intersecting said first joint.

6. The improvement claimed in claim 1, wherein said base structure is substantially rectangularly shaped and has spaced parallel long sides and spaced parallel short sides, and said components comprise a first component including said discharge opening, a second component defining one of said long sides, and a third component defining a portion of one of said short sides.

7. The improvement claimed in claim 1, further comprising means between said base structure and said insert for urging said insert away from said base structure.

8. The improvement claimed in claim 7, wherein said urging means comprises at least one ceramic spring positioned in a blind hole in said base structure and acting on said insert.

9. The improvement claimed in claim 7, wherein said urging means comprises a gas collecting chamber formed between said base structure and said insert, and means for introducing a gas under pressure through said base structure into said chamber.

10. The improvement claimed in claim 9, further comprising means between confronting inner and outer circumferential surfaces of said base structure and said insert, respectively, said means extending from said chamber to said planar sliding surface, for forming a gas seal between said inner and outer circumferential surfaces.

11. The improvement claimed in claim 9, further comprising a wear sleeve extending through said base structure and said insert and defining said discharge opening, said chamber forming a gas seal between said sleeve and said insert.

12. The improvement claimed in claim 1, wherein said base structure has opposite surfaces having therein respective said recesses receiving respective said inserts.

13. The improvement claimed in claim 1, wherein said frame includes a main frame section and a movable frame section, and said clamping means comprises bolts adjustably connecting said movable frame section to said main frame section, and spring means positioned between said bolts and said movable frame section for elastically urging said movable frame section toward said main frame section and thereby for elastically urging said second component and said insert toward said first component.

14. The improvement claimed in claim 1, comprising independent said clamping means acting on respective plural said second components and urging the same toward said first component.

15. The improvement claimed in claim 1, wherein said clamping means comprises an abutment member movably positioned between said frame and said second component, spring means urging said abutment member toward the outer periphery of said second component in a direction transverse thereto, and means for adjusting said spring means.

16. The improvement claimed in claim 15, wherein said adjusting means is operable from the exterior of said frame.

17. The improvement claimed in claim 1, wherein said clamping means comprises a chamber formed in said second component and bordering the periphery of said insert, and means for introducing gas under pressure into said chamber and thereby for urging said insert toward said first component.

18. The improvement claimed in claim 1, wherein said clamping means comprises spring means acting between said second component and the periphery of said insert.

19. The improvement in claim 1, wherein the force of said clamping means is applied to said insert in a direction at a right angle to the periphery thereof.

* * * * *